(12) United States Patent
Luo (10) Patent No.: US 11,079,332 B2
(45) Date of Patent: Aug. 3, 2021

(54) SUBSTANCE DETECTION METHOD AND APPARATUS, AND DETECTION DEVICE (71) Applicant: CLOUDMINDS (SHENZHEN) ROBOTICS SYSTEMS CO., LTD., Guangdong (CN)

(72) Inventor: Lei Luo, Guangdong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 269 days.

(21) Appl. No.: 16/256,822

(22) Filed: Jan. 24, 2019

(65) Prior Publication Data

US 2019/0154586 A1 May 23, 2019

Related U.S. Application Data (63) Continuation of application No. PCT/CN2017/089384, filed on Jun. 21, 2017.

(51) Int. Cl.
*G01N 21/65* (2006.01)
*G01N 21/3563* (2014.01)
*G06T 7/00* (2017.01)
*G01N 21/3577* (2014.01)
(Continued)

(52) U.S. Cl.
CPC ......... *G01N 21/65* (2013.01); *G01N 21/3563* (2013.01); *G01N 21/3577* (2013.01);
(Continued)

(58) Field of Classification Search
CPC .............. G01N 21/65; G01N 21/3563; G01N 21/3577; G01N 2021/0181; G01N 2201/126; G06T 7/0002; G06K 9/00469
(Continued)

(56) References Cited

U.S. PATENT DOCUMENTS 7,573,570 B2 * 8/2009 Zhang .................. G01J 3/02
356/301
2002/0044279 A1 4/2002 Khoury
(Continued)

FOREIGN PATENT DOCUMENTS

CN 101059424 A 10/2007
CN 101419166 A 4/2009
(Continued)

OTHER PUBLICATIONS

First Office Action and Chinese Search Report issued for corresponding Chinese Application No. 201780003268.2, dated Mar. 20, 2020, with English translation attached.

*Primary Examiner* — Daniel G Mariam
(74) *Attorney, Agent, or Firm* — Myers Wolin, LLC (57) ABSTRACT

A substance detection method and apparatus, and a detection device are provided. The method includes: obtaining spectral information and image information of a substance to be detected; performing image recognition according to the image information to obtain appearance state information of the substance to be detected; determining a sub-database matching the appearance state information in a preset spectral database according to the appearance state information, wherein the spectral database includes a plurality of sub-databases classified according to the appearance state of the substance; and matching the spectral information with the obtained spectral information in the sub-database to obtain a detection result of the substance to be detected.

4 Claims, 4 Drawing Sheets

(51) Int. Cl.
*G01N 21/01* (2006.01)
*G06K 9/00* (2006.01)

(52) U.S. Cl.
CPC .... *G06T 7/0002* (2013.01); *G01N 2021/0181* (2013.01); *G01N 2201/126* (2013.01); *G06K 9/00469* (2013.01)

(58) Field of Classification Search
USPC ........................................ 382/141, 181, 224
See application file for complete search history.

(56) References Cited

U.S. PATENT DOCUMENTS

| | | | | |
|---|---|---|---|---|
| 2008/0049220 A1* | 2/2008 | Izzia | .......................... | G01J 3/04 |
| | | | | 356/300 |
| 2010/0209004 A1* | 8/2010 | Poturluri | ................. | G01N 21/31 |
| | | | | 382/209 |
| 2013/0341509 A1* | 12/2013 | Nelson | ................... | G01J 3/2823 |
| | | | | 250/330 |
| 2014/0117239 A1* | 5/2014 | Sakai | ......................... | G01J 3/42 |
| | | | | 250/339.02 |
| 2018/0160510 A1* | 6/2018 | Ramer | .................... | G01J 3/027 |

FOREIGN PATENT DOCUMENTS

| | | |
|---|---|---|
| CN | 101692052 A | 4/2010 |
| CN | 103063585 A | 4/2013 |
| CN | 103124976 A | 5/2013 |
| CN | 103257465 A | 8/2013 |
| CN | 106232480 A | 12/2016 |
| CN | 106679806 A | 5/2017 |
| CN | 106770168 A | 5/2017 |
| WO | 2014/084995 A1 | 6/2014 |

* cited by examiner

SUBSTANCE DETECTION METHOD AND APPARATUS, AND DETECTION DEVICE

CROSS-REFERENCE TO RELATED APPLICATIONS

This application is a continuation application under 35 U.S.C. § 120 of PCT application No. PCT/CN2017/089384 filed on Jun. 21, 2017, the contents of which are incorporated herein by reference.

FIELD OF THE INVENTION

Embodiments of the present application relate to the field of substance detection, for example, relate to a substance detection method and apparatus, and a detection device.

BACKGROUND OF THE INVENTION

In recent years, the application of substance detection devices has become more and more extensive, including the detection of suspicious objects in security inspection, the detection of pharmaceutical ingredients by the Food and Drug Administration, the explosion site investigation of chemical defense troops, and other professional fields, and also including the detection of pesticide residues, the detection of presence of melamine, the detection of waste oil and real and fake wine and other civilian fields, and the substance detection devices are especially widely used in the field of food safety. The existing detection devices, such as a Raman detection terminal, adopt a Raman spectroscopy method, and can detect substance ingredients more quickly and accurately.

In the process of implementing the present application, the inventors have found that at least the following problems exist in the related art: limited by the computing power of the device, once the database is relatively large, the computing and matching speed is too slow. Although the problem can be solved to some extent by using the huge computing power of the power, when the number of concurrent users reaches a certain level and the database is very large, the detection efficiency is also affected.

SUMMARY OF THE INVENTION

One object of the embodiment of the present application is to provide a new substance detection method and apparatus, and a detection device, which can accelerate the substance detection speed.

In a first aspect, the embodiment of the present application provides a substance detection method applied to a detection device, the method including:

obtaining spectral information and image information of a substance to be detected;

performing image recognition according to the image information to obtain appearance state information of the substance to be detected;

determining a sub-database matching the appearance state information in a preset spectral database according to the appearance state information, wherein the spectral database includes a plurality of sub-databases classified according to the appearance state of the substance; and matching the spectral information with the obtained spectral information in the sub-database to obtain a detection result of the substance to be detected.

In a second aspect, the embodiment of the present application further provides a substance detection apparatus applied to a detection device, the apparatus including:

an information obtaining module, used for obtaining spectral information and image information of a substance to be detected;

an image recognition module, used for performing image recognition according to the image information to obtain appearance state information of the substance to be detected;

a sub-database obtaining module, used for determining a sub-database matching the appearance state information in a preset spectral database according to the appearance state information, wherein the spectral database includes a plurality of sub-databases classified according to the appearance state of the substance; and an analysis module, used for matching the spectral information with the spectral information in the sub-database to obtain a detection result of the substance to be detected.

In a third aspect, the embodiment of the present application further provides a detection device, including:

at least one processor; and, a memory in communication connection with the at least one processor; wherein the memory stores instructions executable by the at least one processor, and the instructions are executed by the at least one processor to enable the at least one processor to execute the method described above.

In a fourth aspect, the embodiment of the present application further provides a detection terminal, including a light source and a lens component, the lens component is used for collecting light emitted by the light source and collecting the scattered light of the light through a substance to be detected, so that the detection terminal obtains the spectral information of the substance to be detected according to the scattered light; and the detection terminal further includes:

a camera component used for taking a picture of the substance to be detected, so that the detection terminal obtains the image information of the substance to be detected.

According to the substance detection method and apparatus, and the detection device provided by the embodiment of the present application, by obtaining the spectral information and the image information of the substance to be detected, the detection device can obtain the appearance state information of the substance to be detected through the image information, and spectral comparison is directly performed in the sub-database according to the spectral information of the substance to be detected by selecting the sub-database matching the appearance state information in the spectral database according to the appearance state information, thereby greatly reducing the comparison range, improving the comparison efficiency, and accelerating the substance detection speed.

BRIEF DESCRIPTION OF THE DRAWINGS

One or more embodiments are exemplified by figures in corresponding drawings, these exemplary illustrations do not constitute limitations to the embodiments, elements with the same reference signs are expressed as similar elements, and the figures in the drawings constitute no scale limitation, unless specifically stated otherwise.

DETAILED DESCRIPTION OF THE EMBODIMENTS

In order that the purposes, technical solutions and advantages of the embodiments of the present application are clearer, a clear and complete description of technical solutions in the embodiments of the present application will be given below, in combination with the drawings in the embodiments of the present application. Apparently, the embodiments described below are merely a part, but not all, of the embodiments of the present application. All of other embodiments, obtained by those of ordinary skill in the art based on the embodiments of the present application without any creative effort, fall into the protection scope of the present application.

Figures 1A, 1B:
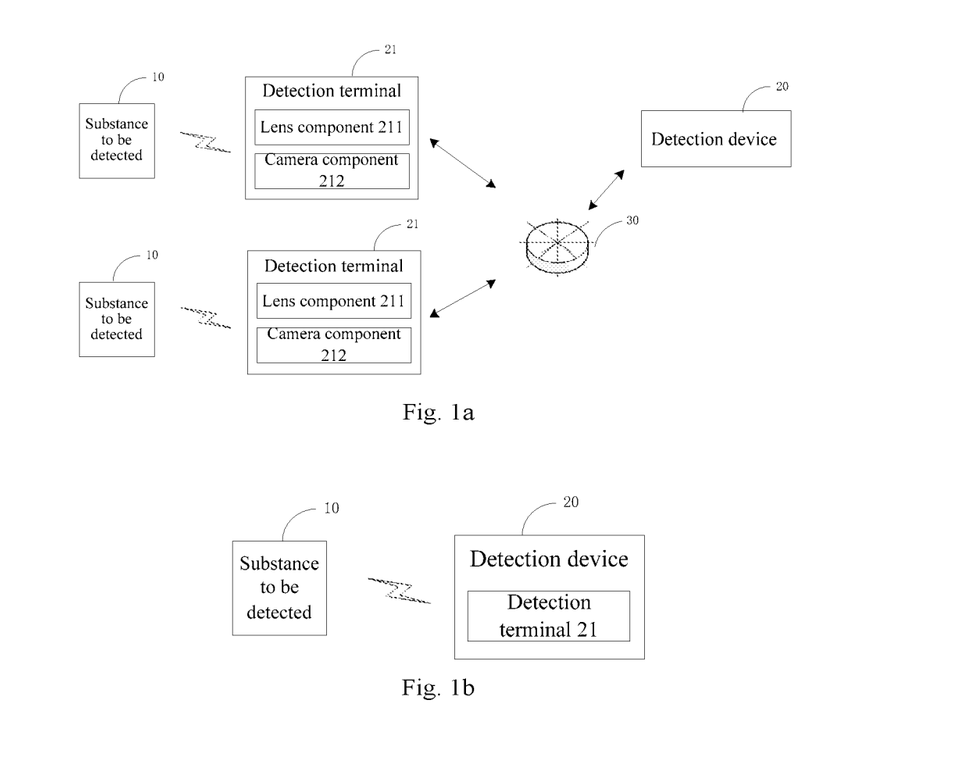
FIG. 1a is a schematic diagram of an application scenario of a method and apparatus of the present application.
FIG. 1b is a schematic diagram of an application scenario of a method and apparatus of the present application.

The embodiment of the present application provides a substance detection solution, which is applicable to the application scenarios as shown in FIG. 1a and FIG. 1b. In the application scenario as shown in FIG. 1a, a substance 10 to be detected, a detection terminal 21 and a detection device 20 are included, wherein the detection terminal 21 includes a lens component 211, a camera component 212 and a light source (not shown), the lens component 211 is used for collecting light emitted by a light source and collecting the scattered light of the light through the substance 10 to be detected, so that the detection terminal 21 obtains the spectral information of the substance 10 to be detected according to the scattered light. The camera component 212 is used for taking a picture of the substance 10 to be detected, so that the detection terminal 21 obtains the image information of the substance 10 to be detected. The detection terminal 21 transmits the spectral information and the image information of the substance 10 to be detected to the detection device 20, and the detection device 20 is used for performing substance detection according to the spectral information and the image information of the substance to be detected. The detection terminal 21 and the detection device 20 can communicate with each other through a network 30, wherein the network 30 can be, for example, a home or company local area network, or a specific network or the like. The detection terminal 21 and the detection device 20 have at least one network interface to establish a communication connection with the network 30. In the present embodiment, the detection device 20 can be a cloud server or other servers connected with the detection terminal 21 via the network.

As shown in FIG. 1b, the detection device 20 can also integrate the functions of the detection terminal 21 into the detection device 20, the detection device 20 independently obtains the spectral information and the image information of the substance 10 to be detected from the substance 10 to be detected, and performs the substance detection on the substance 10 to be detected according to the spectral information and the image information.

The detection device 20 performs image recognition based on the image information, and obtains appearance state information of the substance 10 to be detected, for example, white particles having a granularity of 0.07 mm. The detection device 20 determines a sub-database matching the appearance state information in a spectral database according to the appearance state information. The spectral database can be a Raman spectral database, in a construction process of the spectral database, in addition to storing the spectral and substance name, the appearance state of the substance (e.g., white powder, transparent liquid, pale yellow solid, white particles and the like) is also stored to serve as an index mode of the database, and the substances in the spectral database are correspondingly placed in these appearance state categories.

The detection device 20 matches the sub-database in the spectral database according to the appearance state information, and then can directly perform spectral comparison in the sub-database according to the spectral information of the substance 10 to be detected to determine the name of the substance to be detected. In this way, the spectral comparison does not need to be performed in the entire spectral database, thereby greatly reducing the comparison range and improving the comparison efficiency.

It should be noted that, in an actual application process, the application scenario can further include more substances 10 to be detected, detection devices 20 and detection terminals 21.

Figure 2:
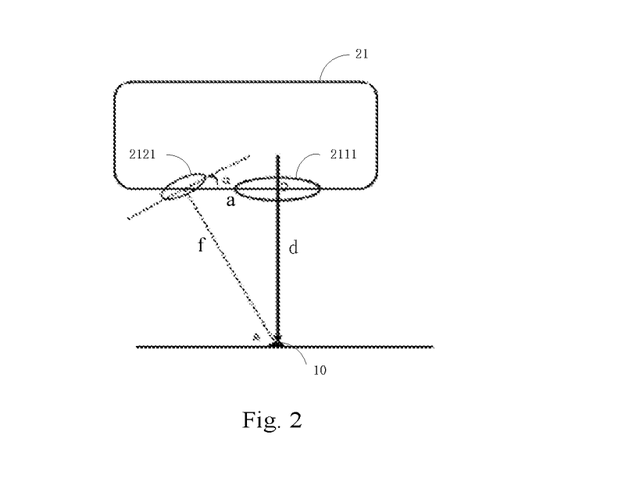
FIG. 2 is a structural schematic diagram of an embodiment of a detection terminal of the present application.

Referring to FIG. 2, which is a structural schematic diagram of an embodiment of the detection terminal 21, the detection terminal 21 includes a light source (not shown), a lens component (not shown) used for causing the detection terminal 21 to obtain the spectral information of the substance 10 to be detected, and a camera component (not shown) used for causing the detection terminal 21 to obtain the image information of the substance 10 to be detected. The lenses of the lens component and the camera component may be fixed focus lenses or zoom lenses.

In the embodiment of the present application, by obtaining the spectral information and the image information of the substance to be detected, the detection device can obtain the appearance state information of the substance to be detected through the image information, and spectral comparison is directly performed in the sub-database according to the spectral information of the substance to be detected by selecting the sub-database matching the appearance state information in the spectral database according to the appearance state information, thereby greatly reducing the comparison range, improving the comparison efficiency, and accelerating the substance detection speed.

Optionally, in some embodiments of the detection terminal 11, the lens component includes a first fixed focus lens 2111, the camera component includes a second fixed focus lens 2121, and the first fixed focus lens 2111 and the second fixed focus lens 2121 are installed on the same direction. In order to obtain a clear image of the substance 10 to be detected, the focal point of the first fixed focus lens 2111 can be located within the range of the depth of field of the second fixed focus lens 2121, so that when the substance 10 to be detected is detected, it can be located within the range of the depth of field of the second fixed focus lens. If a clearer image is desired, the substance 10 to be detected can be kept on a precise focus plane of the second fixed focus lens 2121, for example, the focal point of the first fixed focus lens 2111 and the focal point of the second fixed focus lens 2121 are located at the same point, as shown in FIG. 2.

The focal length of the second fixed focus lens 2121 can be determined according to the focal length of the first fixed focus lens 2111, if the distance between the first fixed focus lens 2111 and the second fixed focus lens is represented as a (i.e., the distance between the center point of the first fixed focus lens 2111 and the center point of the second fixed focus lens 2121), the fixed focal length of the first fixed focus lens 2111 is represented as d, the installation angle of the second fixed focus lens 2121 is represented as $\alpha$, and the fixed focal length of the second fixed focus lens 2121 is represented as f, it can be seen from the geometric relationship in FIG. 2 that:

$$\tan \alpha = a/d;$$

$$a^2 + d^2 = f^2$$

Further, it can be inferred that the installation angle of the second fixed focus lens 2121 is $\alpha = \arctan(a/d)$, and the fixed focal length of the second fixed focus lens 2121 is $f = \sqrt{a^2 + d^2}$.

In practical applications, if the requirements for the resolution of the picture are not particularly high, the focal length of the second fixed focus lens 2121 can be appropriately larger or smaller as long as the focal point of the first fixed focus lens 2111 can be located within the range of the depth of field of the second fixed focus lens 2121, that is, when the substance 10 to be detected is detected, it is located within the range of the depth of field of the second fixed focus lens 2121.

Figure 3:
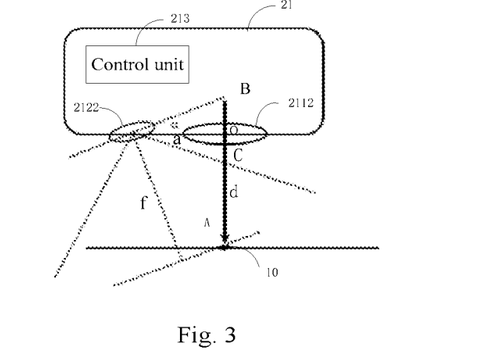
FIG. 3 is a structural schematic diagram of an embodiment of a detection terminal of the present application.

Optionally, in other embodiments of the detection terminal 11, the lens of the lens component can also adopt a zoom lens (for example, an autofocus lens), the lens of the corresponding camera component also adopts the zoom lens, and then, the focal length of the lens in the camera component is determined according to the focal length of the lens in the lens component. As shown in FIG. 3, the lens component includes a first zoom lens 2112, the camera component includes a second zoom lens 2122, and the first zoom lens 2112 and the second zoom lens 2122 are installed in the same direction. In order to keep the substance 10 to be detected on the precise focus plane of the second fixed focus lens 2122, the geometric relationship between the first zoom lens 2112 and the second zoom lens 2122 needs to be as shown in FIG. 3, and it can be seen from FIG. 3 that:

$$OB = a * \tan \alpha;$$

$$AB = OA + OB = d + a * \tan \alpha;$$

$$f = AB * \cos \alpha = d * \cos \alpha + a * \tan \alpha * \cos \alpha = d * \cos \alpha + a * \sin \alpha.$$

After the detection terminal is manufactured, the distance a and an inclination angle $\alpha$ of the second zoom lens 2122 are both fixed values, and the focal length f of the second zoom lens 2122 can be adjusted with the change of the focal length d of the first zoom lens 2112 (the detection terminal itself can obtain a real-time focal length value of the first zoom lens), such that the substance 10 to be detected is on the precise focus plane of the second zoom lens 2122. The detection terminal 11 further includes a control unit 213, and the control unit 213 is used for obtaining a real-time focal length d of the first zoom lens 2112 during the substance detection process, and adjusting the real-time focal length f of the second zoom lens 2122 $f = d * \cos \alpha + a * \sin \alpha$.

As can be seen from FIG. 3, if the linear distance between the substance 10 to be detected and the first zoom lens 2112 is smaller than the length of OC in the figure and the minimum focal length of the first zoom lens 2112 can be smaller than OC, the camera component cannot see the substance 10 to be detected during the detection.

If the minimum focal length d1 of the first zoom lens 2112 is equal to OC, and the field of view angle (FOV angle) of the second zoom lens 2122 is expressed as $\beta$, it can be seen from the geometric relationship in FIG. 3 that:

$$\tan(90° - \alpha - \beta/2) = d1/a;$$

Then, it can be inferred that:

$$\beta = (90° - \alpha - \arctan(d1/a)) * 2;$$

that is to say, when the minimum focus distance of the first zoom lens is OC, then $\beta$ is greater than or equal to $(90° - \alpha - \arctan(d1/a)) * 2$ to ensure that the substance 10 to be detected is within the view angle of the second zoom lens 2122. Therefore, during the actual product design, the condition that the view angle of the second zoom lens needs to be satisfied can be determined according to the minimum focal length of the first zoom lens.

Figure 4:
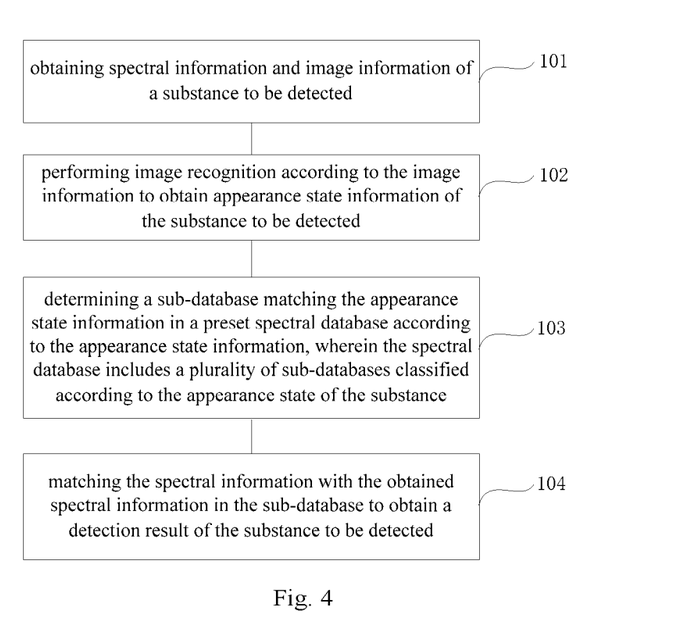
FIG. 4 is a flowchart of an embodiment of a detection method of the present application.

The embodiment of the present application provides a substance detection method, the substance detection method can be executed by the detection device 20 in FIG. 1a and FIG. 1b, and as shown in FIG. 4, the substance detection method includes:

Step 101: obtaining spectral information and image information of substance to be detected.

The spectral recognition method in the embodiment of the present application can be a Raman spectral recognition method, an infrared spectral recognition method, or any other spectral recognition method, that is, the spectral information can be a Raman spectrum, an infrared spectrum, or the like.

Step 102: performing image recognition according to the image information to obtain appearance state information of the substance to be detected.

Based on the existing image recognition technology, the appearance state of the substance to be detected can be obtained according to the image data of the substance to be detected, such as liquid, solid, powder, granule, color and size and the like, for example, the image recognition result is white particles having a granularity of 0.07 mm.

Step 103: determining a sub-database matching the appearance state information in a preset spectral database according to the appearance state information, wherein the spectral database includes a plurality of sub-databases classified according to the appearance state of the substance.

The preset spectral database stores the names of a plurality of substances and the corresponding spectral information, in a construction process of the spectral database, the appearance state of the substance is stored to serve as an index mode of the database, and the substances in the spectral database are correspondingly placed in these appearance state categories. For example, the spectral database is divided into white powder, transparent liquid, pale yellow solid, white particles and other sub-databases. The detection device 20 matches the sub-database classified as white particles in the spectral database according to the appearance state information, that is, the image recognition result "white particles having a granularity of 0.07 mm".

Step 104: matching the spectral information with the obtained spectral information in the sub-database to obtain a detection result of the substance to be detected.

The above example is still used for illustration, after the detection device 20 confirms that the "white particle" sub-database in which the substance to be detected is located, the spectral information in the sub-database is compared according to the spectral information of the substance to be detected so as to determine the name of the substance to be detected.

In the embodiment of the present application, by obtaining the spectral information and the image information of the substance to be detected, the detection device can obtain the appearance state information of the substance to be detected through the image information, and spectral comparison is directly performed in the sub-database according to the spectral information of the substance to be detected by selecting the sub-database matching the appearance state information in the spectral database according to the appearance state information, thereby greatly reducing the comparison range, improving the comparison efficiency, and accelerating the substance detection speed.

Figure 5:
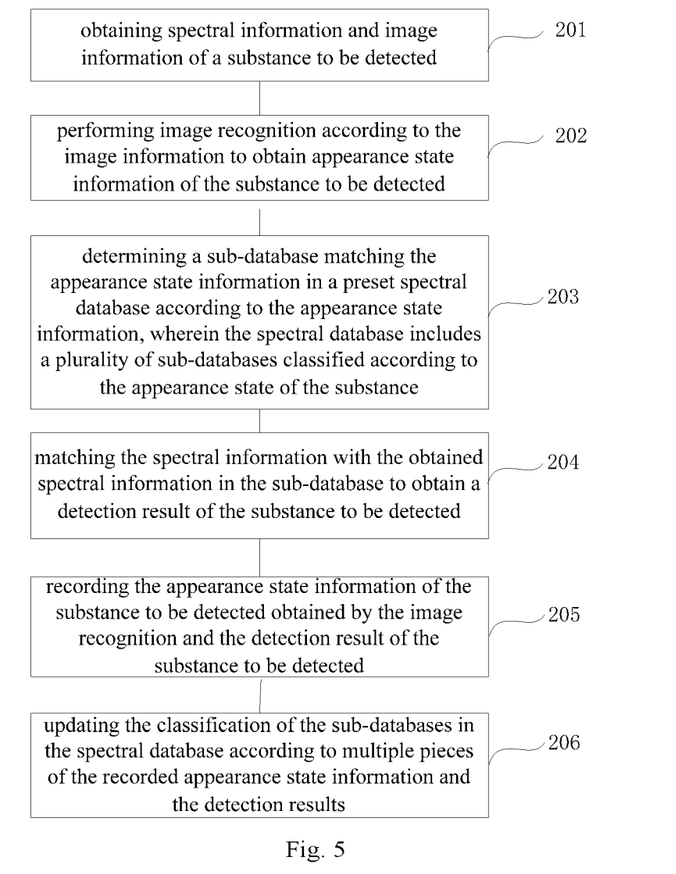
FIG. 5 is a flowchart of an embodiment of a detection method of the present application.

As shown in FIG. 5, it is a schematic flowchart of another embodiment of the method. In the present embodiment, in addition to steps 201, 202, 203, and 204, the method further includes:

Step 205: recording the appearance state information of the substance to be detected obtained by the image recognition and the detection result of the substance to be detected.

The detection device 20 records the result of each image recognition, that is, the appearance state information of the substance to be detected, and the detection result of the substance to be detected, such as, the name of the substance to be detected.

Step 206: updating the classification of the sub-databases in the spectral database according to multiple pieces of the recorded appearance state information and the detection results.

Since the image recognition result may contain more detailed information than the appearance state index of the current spectral database, for example, the image recognition result is "white particles with a granularity of 0.07 mm" and the database index is "white particles". The detection device 20 counts multiple pieces of the recorded appearance state information, if the occurrence times in a certain new more detailed appearance classification in the image recognition result, for example, the occurrence times in the "white particles with a granularity of 0.05-0.1 mm" in the image recognition result exceeds certain times (the times can be preset, for example, 5000), and the "white particles" sub-database is further subdivided, a lower-level index "white particles with a granularity of 0.05-0.1 mm" is set below the index "white particles", and the corresponding substance is placed in the category corresponding to the index according to the name of the substance.

As described above, the index in the spectral database can be made more accurate, when spectral comparison is performed, the number of substances in the compared sub-databases can be ensured to be smaller, that is, the comparison efficiency is higher. In addition to the granularity, the colors can be more accurately subdivided by RGB values, such as powder with a color of (200, 230, 225), or the color value is indexed within a certain range, such as (200±10, 230±10,225±10).

Figure 6:
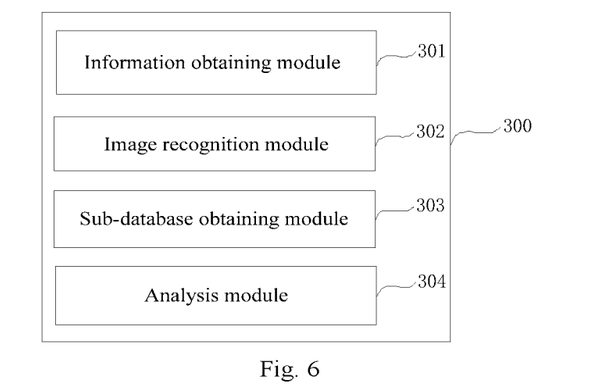
FIG. 6 is a structural schematic diagram of an embodiment of a detection apparatus of the present application.

Correspondingly, the embodiment of the present application further provides a substance detection apparatus, the detection apparatus is applied to the detection device as shown in FIG. 1a or FIG. 1b, as shown in FIG. 6, the detection apparatus 300 includes:

an information obtaining module 301, used for obtaining spectral information and image information of a substance to be detected;

an image recognition module 302, used for performing image recognition according to the image information to obtain appearance state information of the substance to be detected;

a sub-database obtaining module 303, used for determining a sub-database matching the appearance state information in a preset spectral database according to the appearance state information, wherein the spectral database includes a plurality of sub-databases classified according to the appearance state of the substance; and an analysis module 304, used for matching the spectral information with the spectral information in the sub-database to obtain a detection result of the substance to be detected.

In the embodiment of the present application, by obtaining the spectral information and the image information of the substance to be detected, the detection device can obtain the appearance state information of the substance to be detected through the image information, and spectral comparison is directly performed in the sub-database according to the spectral information of the substance to be detected by selecting the sub-database matching the appearance state information in the spectral database according to the appearance state information, thereby greatly reducing the comparison range, improving the comparison efficiency, and accelerating the substance detection speed.

Figure 7:
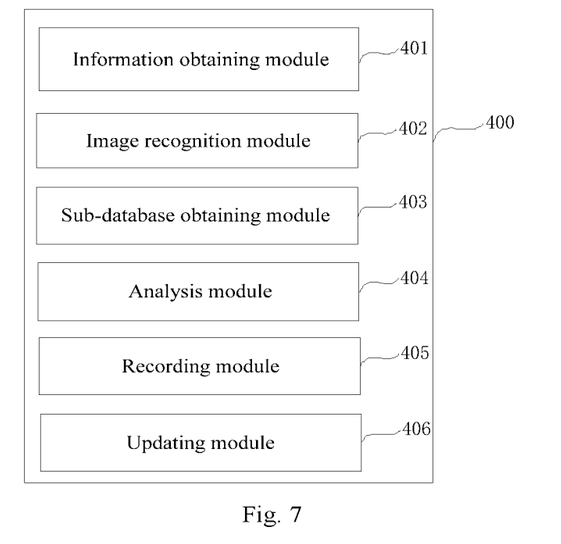
FIG. 7 is a structural schematic diagram of an embodiment of a detection apparatus of the present application.

Optionally, in other embodiments of the apparatus, as shown in FIG. 7, in addition to the modules 401, 402, 403 and 404, the detection apparatus 400 further includes:

a recording module 405, used for recording the appearance state information of the substance to be detected obtained by the image recognition and the detection result of the substance to be detected; and an updating module 406, used for updating the classification of the sub-databases in the spectral database according to multiple pieces of the recorded appearance state information and the detection results.

It should be noted that the foregoing detection apparatus can execute the detection method provided by the embodiment of the present application, and has the corresponding functional modules and beneficial effects of the execution method. With respect to technical details that are not described in detail in the embodiment of the detection apparatus, reference may be made to the detection method provided by the embodiment of the present application.

Figure 8:
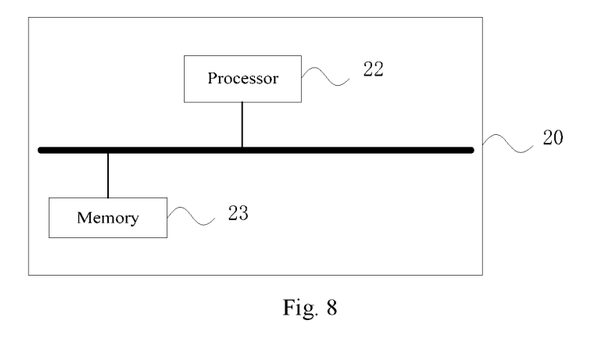
FIG. 8 is a schematic diagram of a hardware structure of a detection device provided by an embodiment of the present application.

FIG. 8 is a schematic diagram of a hardware structure of a detection device 20 provided by an embodiment of the present application. As shown in FIG. 8, the detection device 20 includes:

one or more processors 22 and a memory 23, wherein one processor 22 is used as an example in FIG. 8.

The processor 22 and the memory 23 can be connected through a bus or other mode, and a bus connection is used as an example in FIG. 8.

The memory 23 is used as a non-volatile computer readable storage medium, and can be used for storing non-volatile software programs, non-volatile computer executable programs and modules, such as program instructions/modules corresponding to the detection method in the embodiment of the present application (for example, the information obtaining module 301, the image recognition module 302, the sub-database obtaining module 303, and the analysis module 304 as shown in FIG. 6). The processor 22 executes various functional applications and data processing of a server by running the non-volatile software programs, the instructions and the modules stored in the memory 23, that is, executes the detection method of the above method embodiment.

The memory 23 can include a program storage area and a data storage area, wherein the program storage area can store an operating system and an application program required for at least one function; and the data storage area can store data created according to use of the detection apparatus and the like. Further, the memory 23 can include a high speed random access memory, and can also include a nonvolatile memory, such as at least one magnetic disk storage device, a flash memory device, or other nonvolatile solid state storage devices. In some embodiments, the memory 23 can optionally include memories remotely arranged relative to the processor 22, and these remote memories can be connected to the detection apparatus through the network. The instance of the above network includes, but not limited to, the Internet, an enterprise intranet, a local area network, a mobile communication network, and combinations thereof.

The one or more modules are stored in the memory 23, and when being executed by the one or more processors 22, execute the detection method in any one of the above method embodiments, for example, execute the step 101 to the step 104 of the method as shown in FIG. 4, and the step 201 to the step 206 in the method as shown in FIG. 5; and implement the functions of the modules 301-304 in FIG. 6 and the modules 401-406 in FIG. 7.

Optionally, in other embodiments of the detection device 20, the detection device 20 further integrates the functions of the detection terminal 11 described above. Please refer to FIG. 1b.

The above product can implement the method provided by the embodiment of the present application, and have the corresponding functional modules and beneficial effects of the execution method. With respect to technical details that are not described in detail in the embodiment, reference may be made to the method provided by the embodiment of the present application.

The embodiment of the present application provides a non-volatile computer readable storage medium, the non-volatile computer readable storage medium stores computer executable instructions, the computer executable instructions are executed by one or more processors, for example, one processor 22 in FIG. 8, can cause the one or more processors to execute the detection method in any one of the above method embodiments, for example, execute the step 101 to the step 104 of the method as shown in FIG. 4, and the step 201 to the step 206 in the method as shown in FIG. 5; and implement the functions of the modules 301-304 in FIG. 6 and the modules 401-406 in FIG. 7.

The apparatus embodiments described above are merely exemplary, wherein units described as separate components can be separated physically or not, components displayed as units can be physical units or not, namely, can be located in one place, or can also be distributed on a plurality of network units. A part of or all the modules can be selected to achieve the purposes of the solutions in the embodiments according to actual demands.

By means of the descriptions of the above embodiments, those of ordinary skilled in the art can clearly understand that the embodiments can be implemented by software plus a necessary universal hardware platform, and of course, can be implemented by hardware. Those of ordinary skill in the art can understand that all or a part of the flows in the above method embodiments can be implemented with a computer program instructing corresponding hardware, the program can be stored in a computer readable storage medium, and when being executed, the program can include the flows of the above method embodiments. The storage medium can be a magnetic disk, an optical disk, a read-only memory (ROM), or a random access memory (RAM) or the like.

Finally, it should be noted that the above embodiments are merely used for illustrating the technical solutions of the present application, rather than limiting them; the technical features in the above embodiments or different embodiments can also be combined under the idea of the present application, the steps can be implemented in any order, and there are many other variations of the different aspects of the present application as described above, and for the sake of brevity, they are not provided in the details; although the present application has been described in detail with reference to the foregoing embodiments, those of ordinary skill in the art should understand that they could still make modifications to the technical solutions recorded in the foregoing embodiments or make equivalent substitutions to a part of technical features; and these modifications or substitutions do not make the essence of the corresponding technical solutions depart from the scope of the technical solutions of the embodiments of the present application.

The invention claimed is:

1. A detection terminal, comprising a light source and a lens component, wherein the lens component is used for collecting light emitted by the light source and collecting the scattered light of the light through a substance to be detected, so that the detection terminal obtains the spectral information of the substance to be detected according to the scattered light; and the detection terminal further comprises:
a camera component used for taking a picture of the substance to be detected, so that the detection terminal obtains the image information of the substance to be detected;
wherein the lens component comprises a first fixed focus lens, the camera component comprises a second fixed focus lens; and the distance between the first fixed focus lens and the second fixed focus lens is represented as a, the fixed focal length of the first fixed focus lens is represented as d, then the installation angle of the second fixed focus lens is $\alpha=\arctan(a/d)$, and the fixed focal length of the second fixed focus lens is $f=\sqrt{a^2+d^2}$.

2. The detection terminal according to claim 1, wherein the lens component comprises a first zoom lens, and the camera component comprises a second zoom lens;
the distance between the first zoom lens and the second zoom lens is represented as a, the real-time focal length of the first zoom lens is represented as d, the installation angle of the first zoom lens is represented as a, and the real-time focal length of the second zoom lens is represented as f; and
the detection terminal further comprises a control unit, used for obtaining the real-time focal length d of the first zoom lens, and adjusting the real-time focal length of the second zoom lens $f=d*\cos\alpha+a*\sin\alpha$.

3. The detection terminal according to claim 2, wherein the minimum focal length of the first zoom lens is represented as d1, then the field of view angle of the second zoom lens is: $\beta \geq (90°-\alpha-\arctan(d1/a))*2$.

4. A substance detection device, comprising:
at least one processor;
the detection terminal according to claim 1; and
a memory in communication connection with the at least one processor; wherein the memory stores instructions executable by the at least one processor, and the instructions are executed by the at least one processor to enable the at least one processor to execute the following method:

obtaining spectral information and image information of a substance to be detected;

performing image recognition according to the image information to obtain appearance state information of the substance to be detected;

determining a sub-database matching the appearance state information in a preset spectral database according to the appearance state information, wherein the spectral database includes a plurality of sub-databases classified according to the appearance state of the substance; and matching the spectral information with the obtained spectral information in the sub-database to obtain a detection result of the substance to be detected.

* * * * *